United States Patent Office 3,321,528
Patented May 23, 1967

3,321,528
METHOD FOR PRODUCING BIS(CHLORO-VINYL)SULFIDES
Jack R. Gould, Monsey, and Silvio L. Giolito, Whitestone, N.Y., assignors to Stauffer Chemical Company, New York, N.Y., a corporation of Delaware
No Drawing. Filed Feb. 26, 1964, Ser. No. 347,364
4 Claims. (Cl. 260—609)

This invention relates to the preparation of bis(chlorovinyl)sulfides by the reaction of sulfur dichloride with an alkyne. The invention is particularly concerned with the preparation of bis (2-chlorovinyl)sulfide.

The process of the present invention is realized by causing two moles of an alkyne to react with one mole of sulfur dichloride in accordance with the following chemical scheme:

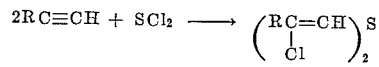

wherein R represents hydrogen or a hydrocarbon residue such as phenyl or an alkyl radical having from 1 to 18 carbon atoms.

In carrying out the aforedescribed reaction, it has been our finding that excellent results are obtained by mixing the reactants together in the presence of a relatively inert normally liquid organic solvent having dissolved therein a polymerization inhibitor. Solvents which have proven especially suitable include the liquid saturated aliphatic esters of lower carboxylic acids such as methyl acetate, ethyl acetate, n-butyl acetate and the like or the lower dialkylformamides such as dimethylformamide. In general the reaction can be performed in any non-interfering media and this includes employing the reactants themselves as solvents.

Where the acetylene starting material is a gas at the reaction temperature, such component is conveniently dissolved in the solvent prior to carrying out the reaction. If necessary, additional amounts of the gaseous component can be introduced during the reaction period.

As above pointed out the process of the invention can be performed with acetylene or its various derivatives commonly referred to as alkynes in the technical literature in which one of the hydrogen atoms of the parent compound has been replaced by various organic substituents or radicals. Specific acetylene derivatives which can be used in practicing the invention include 1-butyne, propyne, ethynylbenzene, ethynyltoluene, bromoacetylene, chloracetylene, 1-hexyne, 1-octyne, and the like.

In general it has been our finding that the reaction between the sulfur dichloride and the acetylene component is conveniently carried out at about room temperature in the presence of a liquid saturated aliphatic ester having a polymerization inhibitor such as hydroquinone dissolved therein. In most instances the reaction is not accompanied by any appreciable temperature change, i.e. it is neither exothermic or endothermic. However, those in the art will appreciate that the reaction can be accelerated or retarded by the application of elevated or below room temperatures. In this connection we have found that with some of the more sluggish acetylene derivatives, particularly those containing a large substituent, slightly elevated temperatures are beneficial in promoting the reaction.

Other suitable polymerizaiton inhibitors in addition to the aforementioned hydroquinone include such phenolic type compounds as resorcinol, 1-naphthol, 2-naphthol, toluhydroquinone, pyrogallol, trimethylhydroquinone, 1,4-naphthohydroquinone and the like.

Reference is now made to the following example which is presented for the purpose of illustration only since variations in practicing the invention without departing from the scope or spirit thereof would be apparent to those skilled in the art to which the said invention pertains.

*Example*

To a saturated solution of acetylene in 500 ml. of ethyl acetate containing 19.0 g. of acetylene was added over a period of one hour, 39.0 g. of sulfur dichloride dissolved in 50 ml. of ethyl acetate. Acetylene was then introduced for two hours after which a few milligrams of hydroquinone was added and the mixture allowed to stand overnight while cooling with Dry Ice. The solvent was removed by distillation thereby giving 57 g. of a residual oil which on fractionation yielded 21.0 g., 40% yield of bis(2-chlorovinyl)sulfide, B.P. 73–74.5° C. at 13 mm.

Bis(2-chlorovinyl)sulfide is a known compound exhibiting several useful and interesting properties. It is a versatile chemical entity which because it possesses multiple reactive centers, i.e. chlorine, double bond and a sulfide function, can be transformed into a wide variety of new and unusual derivatives.

We claim:
1. The method of preparing bis(2-chlorovinyl)sulfide which comprises reacting in a molar ratio of 2 to 1 sulfur dichloride with acetylene in a reaction medium comprising a polymerization inhibitor selected from the group consisting of hydroquinone, resorcinol, 1-naphthol, 2-naphthol, toluhydroquinone, pyrogallol, trimethylhydroquinone, and 1,4-naphthohydroquinone and a solvent selected from the group consisting of liquid saturated aliphatic esters of lower carboxylic acids and lower dialkyl formamides, and isolating the so formed bis(2-chlorovinyl) sulfide.
2. The method according to claim 1 wherein the polymerization inhibitor is hydroquinone.
3. The method according to claim 1 wherein the reaction is carried out at about room temperature.
4. The method according to claim 1 wherein the solvent is ethyl acetate.

References Cited by the Examiner
UNITED STATES PATENTS
2,908,717   10/1959   Johnston _____ 260—609

OTHER REFERENCES
Brandsma et al., Rec. Frav. Chim., vol. 80, pp. 241 and 242 (1961).

CHARLES B. PARKER, *Primary Examiner.*
JOSEPH P. BRUST, *Examiner.*
DELBERT R. PHILLIPS, *Assistant Examiner.*